United States Patent

Andersen

[15] 3,646,838
[45] Mar. 7, 1972

[54] METHOD OF MACHINING CYLINDRICAL SHELLS

[72] Inventor: Axel Brix Andersen, Larchmont, N.Y.
[73] Assignee: F. L. Smidth & Co., New York, N.Y.
[22] Filed: Apr. 17, 1970
[21] Appl. No.: 33,136

Related U.S. Application Data

[62] Division of Ser. No. 670,243, Sept. 25, 1967, Pat. No. 3,550,488.

[52] U.S. Cl. .................................................. 82/1 C, 33/46
[51] Int. Cl. ......................................................... B23b 1/00
[58] Field of Search .................................. 82/1 C; 33/46 AT

[56] References Cited

UNITED STATES PATENTS 2,079,791  5/1937  Cook............................................82/1 C
2,378,401  6/1945  Gardner........................................82/1 C
3,321,248  5/1967  Williamson et al..............33/46 AT X

*Primary Examiner*—Leonidas Vlachos
*Attorney*—Pennie, Edmonds, Morton, Taylor and Adams

[57] ABSTRACT

The faces or heads of large cylindrical vessels or shells are machined so that their surfaces are precisely parallel and have a common centerline. For example, ball mill or rod mill shells too large to place in any lathe, are machined to receive the conventional trunnions at their opposite ends. The operation is accomplished with great precision, the faces being machined parallel and any shoulders being machined on a common centerline, i.e., the axis of the shell. Two machining mechanisms are temporarily mounted within and one at each end of the shell. The tool shafts of these mechanisms are hollow and are aligned by the use of a laser or other suitable radiation beam.

3 Claims, 5 Drawing Figures

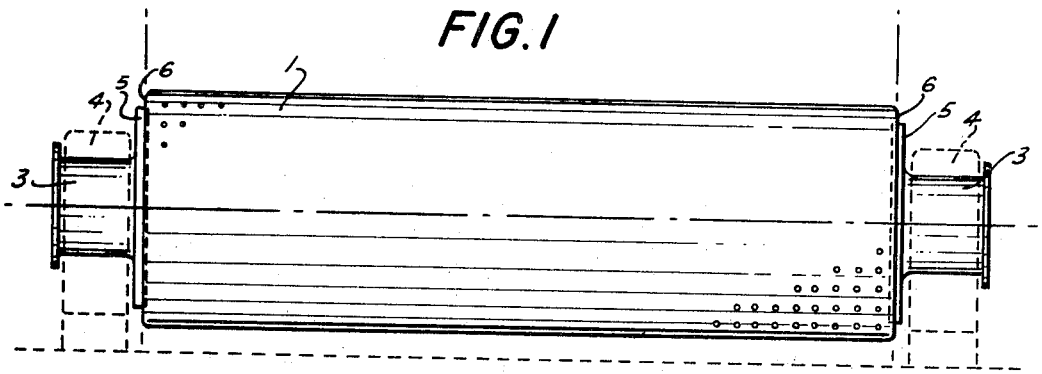
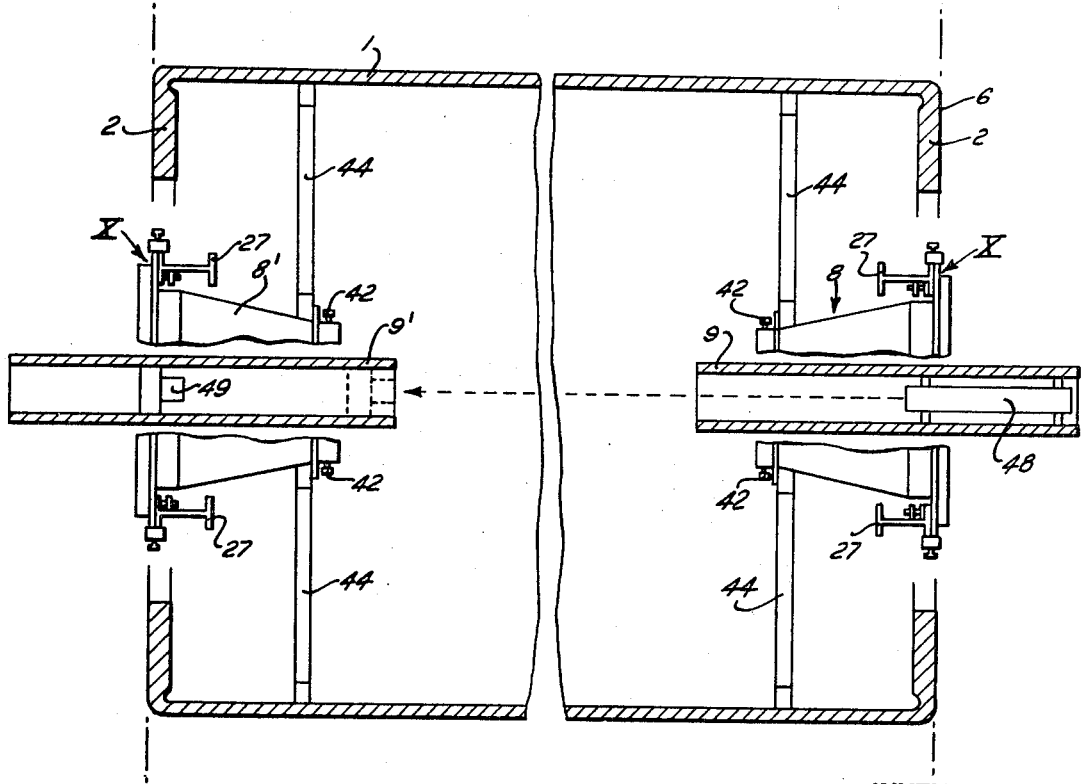

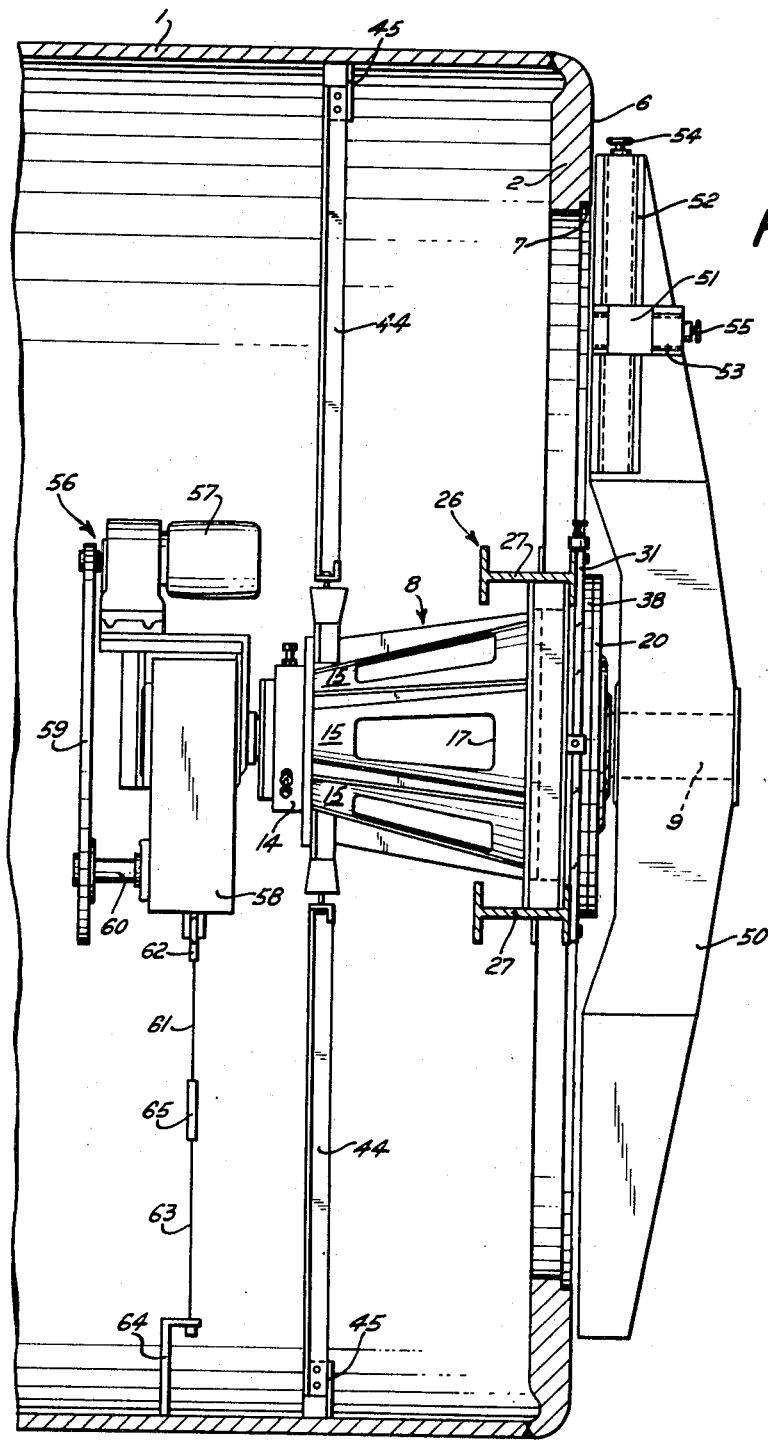

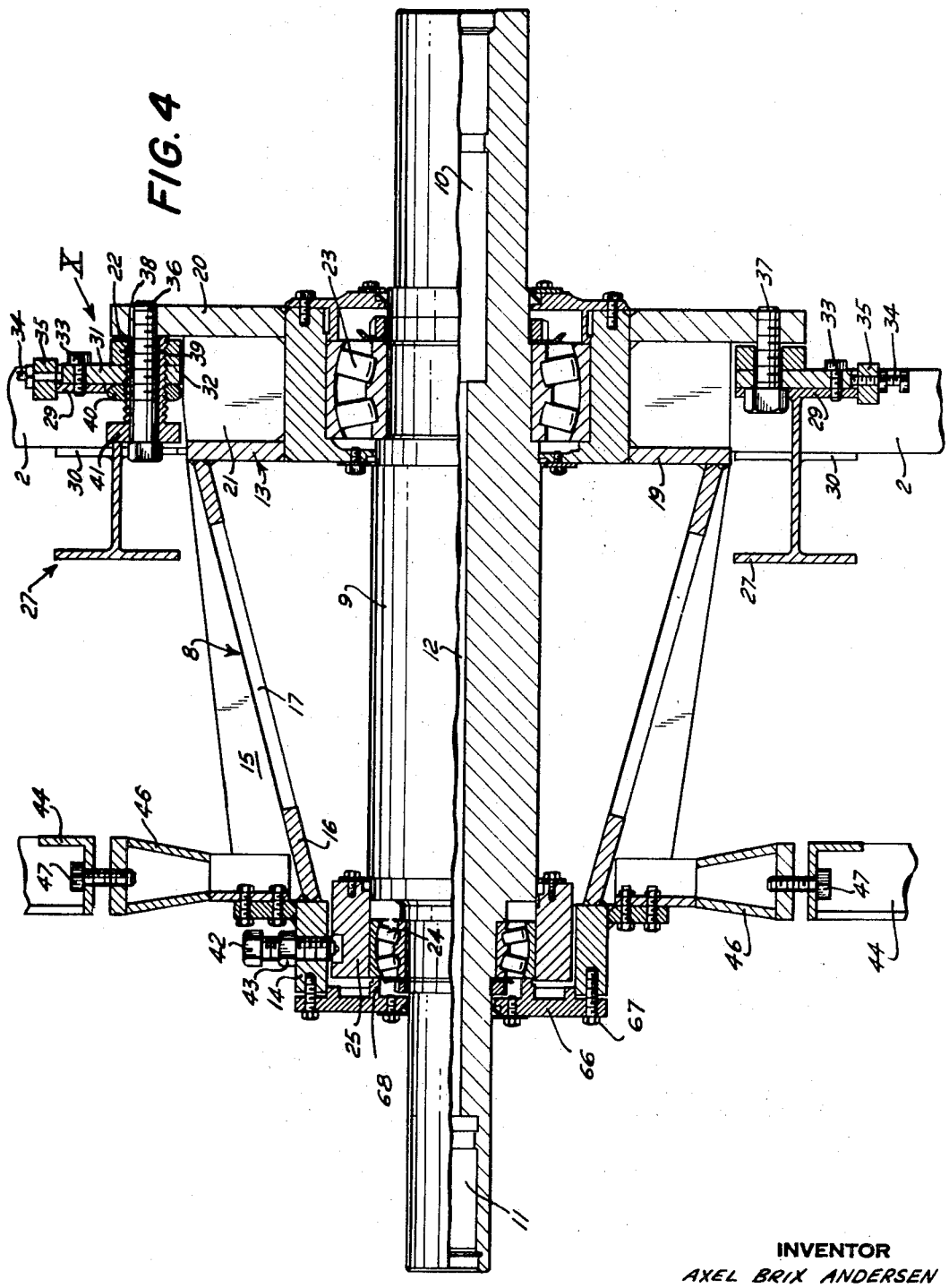

METHOD OF MACHINING CYLINDRICAL SHELLS

This is a divisional application of my copending application, Ser. No. 670,243, filed Sept. 25, 1967 and now U.S. Pat. No. 3,550,488.

BRIEF SUMMARY OF THE INVENTION

Surfaces such as the faces or heads of, or cylindrical shoulders in the faces of, the large cylindrical shells are machined while the shell rests upon any convenient support such as the factory floor. A machining mechanism is supported within but adjacent each end of the shell on a temporary framework usually welded to the interior of the shell and connected to the front end of the housing for the machining mechanism. Also radially adjustable arms for supporting the inner end of the housing are provided. Each of these mechanisms includes a hollow tool-carrying shaft having a tool arm fixed at right angles thereto at its outer end, a cutting tool and tool holder being mounted on the tool arm. Appropriate means are provided for positioning the tool shaft with respect to the shell axis.

The two machining mechanisms are first centered with respect to the axis of the shell, and then a radiation beam source such as a laser source is mounted within the hollow shaft of one of the machining mechanisms, and a target for such beam is mounted within the hollow shaft of the other machining mechanism at the opposite end of the shell. Adjustment of the two supporting housings is carried on through the use of the radiation beam and target until the two tool shafts are supported in precise axial alignment by their respective machine mechanism housings. The tool arm is then rotated by means of an electric motor arranged to drive the tool shaft, and the machining operations on the ends of the shell are carried out.

The machining mechanisms, although of considerable weight, are portable, and can be transferred from one mill shell, or other type of shell to another. They are also comparatively inexpensive.

BRIEF DESCRIPTION OF THE VIEWS OF THE DRAWINGS

FIG. 1 is a diagrammatic side elevation of a ball mill;

FIG. 2 is a diagrammatic vertical central section of the ball mill shell drawn to a somewhat larger scale, with the central part of the shell broken away, said illustrating the aligning of the hollow tool shafts at opposite ends of the shell;

FIG. 3 is a vertical section of the right end portion of the shell drawn to a much larger scale and showing the machining apparatus at that end of the shell;

FIG. 4 is a central section of the machining mechanism housing drawn to a still larger scale and showing portions of the supporting means at each end of the housing and with only the lower portion of the shaft shown in section, the driving mechanism and the tool arm being omitted.

DETAILED DESCRIPTION

Figure 5:
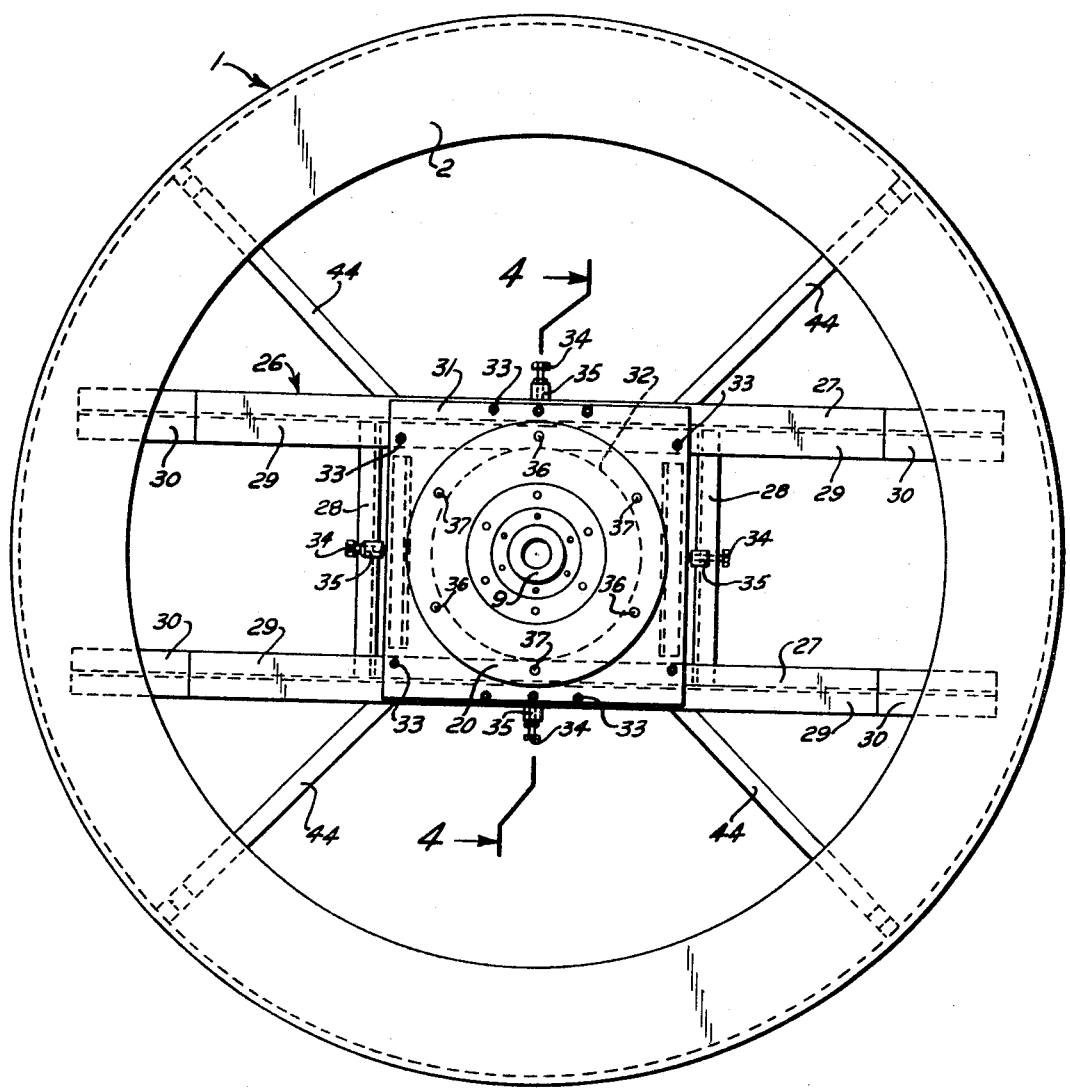
FIG. 5 is an end view of the parts shown in FIG. 3 drawn to a somewhat smaller scale and with the tool arm omitted.

Referring now to FIGS. 1 and 2 the ball mill comprises a cylindrical steel shell 1 having inwardly projecting circular flanges 2 somewhat thicker than the wall of the shell and welded thereto at its opposite ends. A trunnion 3 is mounted on each end of shell 1 and these turn in stationary bearings 4 which are bolted to a common support as shown. It is evident that the trunnions 3 must be in accurate alignment on the centerline of the shell for proper operation of the ball mill. For this reason each of the trunnions includes a flange 5 which is bolted to the respective opposite end surfaces 6 of the shell.

Trunnions 3 are centered on the respective ends of the shell by cylindrical inward projections (not shown) each of which engages a narrow shoulder 7 (FIG. 3) on the edge of the corresponding flange 2. It is essential that the surfaces 6 on the opposite ends of the shell be machined to precise parallelism on a common centerline namely the axis of cylinder 1; it is also essential that shoulders 7 be machined precisely concentric with the same axis; otherwise trunnions 3 will not be in proper alignment with each other.

The apparatus for such precise machining of the surfaces at the ends of shell 1 comprises a housing 8 for the machining mechanism within which is mounted a hollow shaft 9 having an enlarged recess 10 at its outer end and a somewhat smaller recess 11 at its inner end, the two recesses being connected by a relatively narrow passageway 12. Housing 8 is built up of welded parts including an outer framework 13 and an inner collar 14 which are interconnected by a cone 16 having a number of rectangular apertures 17 and reinforced by a number of strengthening ribs 15, six being shown.

Framework 13 is a welded assembly made up of an inner circular member 19 and outer circular endplate 20, and a series of radially arranged web members 21 which serve to interconnect members 19 and 20. End plate 20 is substantially thicker than member 19 and is also larger in diameter so as to provide a flangelike rim to aid in supporting the housing 8 within the outer end portion of shell 1.

Shaft 9 is rotatably supported near its outer end by a spherical roller bearing 23, the outer member of which is fixed within the central portion of framework 13. The inner end portion of shaft 9 is also supported in a spherical roller bearing indicated by numeral 24, the housing of which is indicated by reference numeral 25 which is positioned inwardly of collar 14.

The first step in the operation of machining the ends of shell 1 is the placing at each end of the shell of a special framework indicated generally by numeral 26 and shown more particularly in FIG. 5. This framework comprises parallel upper and lower horizontal wide flange beams 27, and two vertical channel members 28 which are welded at their opposite ends to beams 27 and serve to interconnect them. Beams 27 are welded at their ends as indicated in FIG. 5 to the inside surface of the shell end flange 2. In order to position the outer end portion of housing 8, outwardly beyond the inner surface of flange 2, beams 27 have special formations at their outer ends as indicated in FIG. 5. That is to say, at each end of the two beams 27 a portion of the outer flange 29 is cut away as indicated and a short flange section 30 is welded to the web at a distance inwardly from the outer flange as shown in FIG. 4. The two beams 27 are supported by welding these short inwardly placed flange sections 30 to the inside of the circular flange 2 of the mill shell.

The outer end portion of housing 8 is supported on framework 26 by means of a square mounting plate 31 having a circular hole 32 therein shown in dotted lines in FIG. 5. Plate 31 is secured in position by means of holding bolts or screws 33, three of which are arranged centrally in line along the top edge and also along the bottom edge of the plate, and four of which are near the corners of the plate as shown. However before these bolts are tightened it is important to locate the center of hole 32 fairly closely to the center of shell 1. For this purpose four jackscrews 34 are arranged at the centers of the four sides of square plate 31. The two jackscrews at the top and bottom respectively are threaded into bosses 35 which are welded to the edges of flanges 29 of the beams 27. Jackscrews 34 at the sides of the square plate are threaded into bosses 35 which are welded to the outer flanges of channel members 28.

In order to properly locate square plate 31 the distance from the edge of hole 32 therein to the inside of shell 1, or to the inside surface of flange 2 is measured in any appropriate manner and the position of plate 31 is adjusted by means of jackscrews 34 until the plate is in the desired central position. Thereupon the holding bolts 33 are tightened.

Referring now more particularly to FIG. 4 the outer end portion of housing 8 is secured to the square mounting plate 31 by means of six screws, three of which are part of an adjusting complex indicated generally by reference letter X, the other three being merely mounting screws. One of the adjusting complexes is shown at the top of FIG. 4 and includes screw 36. These complexes are arranged 120° apart around the end plate 20, and the holding screws such as screw 37 shown at the bottom of FIG. 4 are located in intermediate positions.

Surrounding the hole 32 in mounting plate 31 and welded to this plate there is a ring member 38, the width of which corresponds approximately to the rim portion 22 of plate 20.

Each of the adjusting complexes includes bolt 36 which is threaded in an aperture in end plate 20, a collar 39 which turns on the outer portion of bolt 36, and is externally threaded, and a lock nut 40. Threaded collar 39 has an operating head 41 at its inner or left-hand end. The threads of collar 39 are engaged in aligned threaded apertures in mounting plate 31 and its companion ring 38.

The outer or right-hand end of collar 39 always projects slightly beyond the outer surface of ring 38 into contact with the inner portion of rim portion 32 and thus holds end plate 20 out of contact with ring 38. By adjusting the collars 39 of the three adjusting complexes arranged 120° apart the angular position of end plate 20 and therefore of the entire machining mechanism housing 8 can be adjusted at will to thereby change the position of the axis of shaft 9 in any direction.

The turning of collars 39 is accomplished by applying a wrench or any other suitable tool to the operating head 41. This adjustment is accomplished with bolt 36 slightly released from its tightened position, and after the desired angular position of shaft 9 has been arrived at bolt 36 is tightened forcing the inner end of threaded sleeve 39 against the inner surface of end plate 20 and lock nut 40 is also tightened on sleeve 39 against the inner surface of mounting plate 31. The same adjusting and tightening operations are followed in connection with the other two adjusting complexes, and when this has been done the simple clamping bolts 37 arranged intermediate the adjusting bolts 36 are tightened.

At the inner end of housing 8 there is a further means of adjustment of the position of shaft 9 in this housing. This is accomplished by means of three adjusting screws 42, each having a lock nut 43 and arranged 120° apart in threaded openings in collar 14. The inner ends of these screws cooperate with housing 25 for the inner roller bearings 24.

In order to support the inner end portion of housing 8 four radially mounted angle bars 44 are provided. These are each bolted to a short anchor member 45 which, like the ends of channel beams 27 are temporarily welded to the inner surface of shell 1 in positions to place the bracing members 44 approximately parallel with the end flange 2. In order to connect braces 44 at their inner ends with housing 8 suitable connecting members 46 are bolted as shown in FIG. 4 to the ring surrounding collar 14 of housing 8. The inner ends of braces 44 and the outer ends of connectors 46 are constructed to receive interconnecting screws 47, and the adjacent ends of each member 44 and its connector 46 are spaced somewhat apart so as to permit the angular adjustment of housing 8 in the manner above described. After such adjustment has been completed connecting screws 47 are tightened in order to support the housing. As all roller bearings are manufactured within a certain tolerance, it is important that any bearing slack be eliminated before the devices are put to use so as to prevent the chattering of the cutting tool during the machining operations. The end cover 66 is fixed to collar 14 by means of a number of screws 67 in such a manner that the circular projection 68 is brought to bear against the outer race of roller bearing 24. When tightening the screws 67, the hollow shaft 9 will move axially until resisted by bearing 23, i.e., the bearing slack in both bearings has been eliminated through this maneuver.

It will be understood that a machining mechanism housing 8 is mounted in the opposite end of mill shell 1 in the same manner as described above. After this has been done the shafts 9 of the two housings 8 are brought into precise alignment in the following manner:

A device 48 which is a source of a radiation beam, such as a laser, is mounted in recess 10 at the outer end of shaft 9 at the right end of the mill shell, and a target member 49 is mounted in recess 10 at the left end of the shaft 9 of housing 8 which has been mounted on the left end of mill shell 1. This places the target outwardly from the center of shaft 9 and near the shell end. The respective supports for the beam source 48 and the target 49 are accurately machined to closely fit the respective recesses in the two shafts 9.

With the radiation source 48 in operation the three adjusting complexes X, (FIG. 4) for adjusting the angular position of housing 8 with respect to supporting frame 31, are manipulated until the radiation beam is on the center of target 49. The three adjusting complexes X and screws 37 are then tightened into clamped position.

Target 49 is now moved to the dotted position (FIG. 2) at the forward end of the same shaft 9, and by means of the three complexes X in the same device, the angular position is adjusted until the laser beam also hits the center of the target in that position. The target may now be moved back to its former position and the alignment checked again.

The bolts 47 by which the inner end of the housings 8 are bolted to the eight braces are now tightened. Any misalignment which may have been caused by this last operation is corrected by means of the three adjustment screws 42 at the inner end of the housings 8.

When such adjustment has brought the user beam to the center of target 49 in both positions the centers of the two shafts 9 are located precisely in alignment with each other. If desired however this may be checked further by interchanging the positions of the laser beam source and the target. It may be desirable to make several of these checks but in a relatively short time the centerlines of the two shafts can be brought into perfect alignment.

With the positions of the two shafts 9 securely fixed a tool arm 50 is mounted on the outer end of one or both of the shafts and the outside surface at one end or both ends of the mill body may be machined with full assurance of the parallelism and concentricity of surfaces machined.

In order to carry out this machining operation a cutting tool (not shown) and the tool holder indicated diagrammatically at 51 in FIG. 3 are provided on tool arm 50. Tool holder 51 is mounted on a compound ways, namely a radial ways 52 and a ways 53 which is parallel to the axis of shaft 9. The position of the tool holder 51 is adjusted along ways 52 in a convenient manner as, for example, by means of a screw 54. A similar feed screw 55 adjusts the position of the tool holder along ways 53. It will be understood the tool will be adjusted along ways 52 to machine the end surface 6 on the mill head, and when it is desired to machine the narrow cylindrical shoulder 7 the tool holder 51 is adjusted along ways 53. The feed of the screws 54 and 55 can be accomplished in any conventional manner.

The machining of surfaces 6 and 7 at the opposite ends of the mill body may be done simultaneously if desired.

In order to rotate tool shaft 9 a driving mechanism indicated generally by numeral 56 is mounted on the left-hand end of the shaft as shown in FIG. 3. Such mechanism comprises an electric or other driving motor 57, suitable speed-reducing mechanism (not shown) arranged within a housing 58, and a chain 59 interconnecting the motor shaft and the drive shaft 60 of the speed reducing mechanism.

A suitable bearing (not shown) is arranged within housing 58 so that shaft 9 may turn freely in this housing. The entire driving mechanism is held in stationary position so as to absorb the reaction of the torque necessary to rotate tool arm 50, by means of any appropriate connection with the interior of the shell 1. Such a connection may include an upper rod 61 connected with an eye member 62 bolted to the lower portion of housing 58, and a lower rod 63, the lower end of which is secured to a bracket 64 temporarily welded to the interior of the shell. The adjacent ends of rods 61 and 63 are connected together by means of a turnbuckle 65.

It will be understood that the term "mill shell" as used in this application includes not only a grinding mill shell for a ball mill or a rod mill, but also any elongated hollow vessel or body the ends of which require machining to precise parallelism, or which requires a bore or shoulder to be machined concentric with the axis of the shell.

I claim:

1. The method of machining surfaces at the end of a cylindrical shell which comprises mounting within and adjacent each end of the shell on a suitable support connected to the shell a machining mechanism having a tool-carrying hollow shaft rotating in suitable bearings, approximately centering the machining mechanisms with respect to the axis of the shell, mounting on one of said hollow shafts a radiation beam source whose beam coincides with the axis of the shaft, mounting within the hollow shaft at the opposite end of the shell an axially placed target disposed outwardly beyond the center of said shaft, precisely positioning the tool shaft of the machining mechanism carrying the radiation beam source by angularly adjusting said machining mechanism on its support, then moving said target to a point near the inner end of said shaft and again angularly adjusting said machining mechanism until the two shafts are in precise axial alignment, and operating the machining mechanisms to machine the shell end surfaces.

2. The method of machining surfaces on the opposite ends of a cylindrical shell as set forth in claim 1 wherein the adjustment is carried forward by reversing the locations of the beam source and target with respect to said hollow shafts.

3. The method of machining surfaces at the opposite ends of a cylindrical shell as set forth in claim 1 which includes the step of eliminating the slack in the bearings for the tool-carrying hollow shafts of the two machining mechanisms.

* * * * *